(12) United States Patent
Sobrenilla et al.

(10) Patent No.: US 12,120,584 B2
(45) Date of Patent: Oct. 15, 2024

(54) SENDING A VOICE CLIP AS A SHORT MESSAGE SERVICE (SMS) MESSAGE IN PLACE OF A VOICEMAIL MESSAGE

(71) Applicant: T-Mobile Innovations LLC, Overland Park, KS (US)

(72) Inventors: Melodie Magdalene Sobrenilla, Sumner, WA (US); Derrick Lynn Ives, North Bend, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 77 days.

(21) Appl. No.: 17/646,699

(22) Filed: Dec. 31, 2021

(65) Prior Publication Data

US 2023/0232192 A1   Jul. 20, 2023

(51) Int. Cl.
*H04W 4/14* (2009.01)
(52) U.S. Cl.
CPC ..................................... *H04W 4/14* (2013.01)
(58) Field of Classification Search
CPC ........................... H04M 3/537; G06Q 10/1095
USPC ................... 455/412.2, 414.1, 413
See application file for complete search history.

(56) References Cited

U.S. PATENT DOCUMENTS

| 2014/0113581 A1* | 4/2014 | Nassimi | H04M 3/533 455/404.1 |
| 2014/0169539 A1* | 6/2014 | Mumick | H04M 3/48 379/88.23 |
| 2015/0222753 A1* | 8/2015 | Noldus | H04M 3/5307 455/412.2 |
| 2020/0153961 A1* | 5/2020 | Mittal | H04M 3/493 |

\* cited by examiner

*Primary Examiner* — Kiet M Doan
(74) *Attorney, Agent, or Firm* — Shook, Hardy & Bacon L.L.P.

(57) ABSTRACT

Systems and methods for sending a voice clip as a short message service (SMS) message in place of a voicemail providing include a provider device including an options screen, a cell site, and message management circuitry communicatively coupled to the cell site and a contact center. The provider device is structured to call a receiving device. If the provider device fails to receive an answer, the user of the provider device is presented with multiple options: leave a video recording in a text message, leave the voice clip in a text message, transcribe voice clip to text message, or leave a voicemail. The user of the provider device then selects one of the multiple options on the provider device. The provider device then transitions from a dialer to a message application and delivers the message to the receiving device.

16 Claims, 4 Drawing Sheets

SENDING A VOICE CLIP AS A SHORT MESSAGE SERVICE (SMS) MESSAGE IN PLACE OF A VOICEMAIL MESSAGE

TECHNICAL FIELD

The present disclosure generally relates to wireless messaging systems, and more particularly, to sending a voice clip as a short message service (SMS) message in place of a voicemail message.

BACKGROUND

Mobile device users have become accustomed to leaving voicemail messages and sending text messages. The increase in mobile device use has led many users to have voicemail boxes that are full and cannot accept another message. In some cases, it is urgent that a caller leave message and at the moment of the call may not be able to send a separate text message. In addition, other users have seen a rise in "spam" or unwanted voice messages and no longer check voicemail messages frequently. Other users simply prefer to use text messages when a called party does not answer. This may mean making one call to see if the called party answers, and if not, then leaving a voicemail or a text message. Leaving the text message in place of the voicemail message requires a second process, something not desirable for users who may be driving.

There is a need in the art for an option to send a voice clip as a text message using a messaging application such as the Short Message Service (SMS) or Rich Communication Services (RCS) applications. The clip sent may include audio or video in addition to the text. Mobile users may be presented with multiple options for the message and may opt to send the message after a called party does not answer or a predetermined number of rings.

SUMMARY

The present disclosure is directed, in part, to providing a method for sending a voice clip as a message in place of a voicemail message. The method begins when a provider device, or calling device, calls a receiving device and fails to receive an answer. When the receiving device does not answer the user of the provider device is presented with multiple options: leave a video recording in a text message, leave the voice clip in a text message, transcribe voice clip to text message, or leave a voicemail. The user of the provider device then selects one of the multiple options on the provider device. The provider device then transitions from a dialer to a message application and delivers the message to the receiving device.

A further aspect of the disclosure provides a computer-readable storage media having computer-executable instructions embodied that, when executed by one or more processors, cause the processors to: calling, by a provider device, a receiving device; upon failing to receive an answer, provides multiple options on an options screen on the provider device: leave a video recording in a text message, leave the voice clip in a text message, transcribe the voice clip to text message, leave a voicemail. The user of the provider device then selects one of the multiple options using the options screen. The provider device then transitions from a dialer to a message application and then delivers the message to the receiving device.

In aspects set forth herein, a provider device is connected to a telecommunication network. A system for sending a voice clip as a message in place of a voicemail, the system comprises: a provider device comprising an options screen, a cell site, and message management circuitry communicatively coupled to the cell site and a contact center, the provider device structured to: call a receiving device; receive multiple options on the provider device after failing to receive an answer from the receiving device: leave a video recording in a text message, leave the voice clip in a text message, transcribe voice clip to text message, leave a voicemail; selecting one of the multiple options on the provider device; transitioning, by the provider device from a dialer to a message application, and; delivering the message to the receiving device.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the invention is described with specificity herein to meet statutory requirements. However, the description itself is not intended to limit the scope of this disclosure. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

The present disclosure is directed, in part, to providing a method for sending a voice clip as a message in place of a voicemail message. The method begins when a provider device, or calling device, calls a receiving device and fails to receive an answer. When the receiving device does not answer the user of the provider device is presented with multiple options: leave a video recording in a text message, leave the voice clip in a text message, transcribe voice clip to text message, or leave a voicemail. The user of the provider device then selects one of the multiple options on the provider device. The provider device then transitions from a dialer to a message application and delivers the message to the receiving device.

A further aspect of the disclosure provides a computer-readable storage media having computer-executable instructions embodied that, when executed by one or more processors, cause the processors to: calling, by a provider device, a receiving device; upon failing to receive an answer, provides multiple options on an options screen on the provider device: leave a video recording in a text message, leave the voice clip in a text message, transcribe the voice clip to text message, leave a voicemail. The user of the provider device then selects one of the multiple options using the options screen. The provider device then transitions from a dialer to a message application and then delivers the message to the receiving device.

In aspects set forth herein, a provider device is connected to a telecommunication network. A system for sending a voice clip as a message in place of a voicemail, the system comprises: a provider device comprising an options screen, a cell site, and message management circuitry communicatively coupled to the cell site and a contact center, the provider device structured to: call a receiving device; receive multiple options on the provider device after failing to receive an answer from the receiving device: leave a video recording in a text message, leave the voice clip in a text message, transcribe voice clip to text message, leave a voicemail; selecting one of the multiple options on the provider device; transitioning, by the provider device from a dialer to a message application, and; delivering the message to the receiving device.

Advantageously, providing users with options in addition to the standard voicemail option may increase message delivery success. Callers may know the preferences of those being called and may elect to deliver a video clip, embed the video in the message, or transcribe a short voice clip that will be sent as a text message.

Throughout this disclosure, several acronyms and shorthand notations are used to aid the understanding of certain concepts pertaining to the associated system and methods. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and non-removable media, non-transitory and/or transitory media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 400 shown in FIG. 4. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

The terms "user equipment," "UE," "provider device," "receiver device," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, the UE may take on any variety of devices, such as a personal computer, laptop computer, tablet, netbook, mobile phone, smart phone, personal digital assistant, wearable device, augmented reality device, fitness tracker, or any other device capable of communicating using one or more resources of the network. The UE may include components such as software and hardware, a processor, a memory, a display component, a power supply or power source, a speaker, a touch-input component, a keyboard, and the like. In embodiments, some of the UE discussed herein may include current UE capable of using 5G or 6G and having backward compatibility with prior access technologies, current UE capable of using 5G or 6G and lacking backward compatibility with prior access technologies, and legacy UE that is not capable of using 5G or 6G.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

Figure 1:
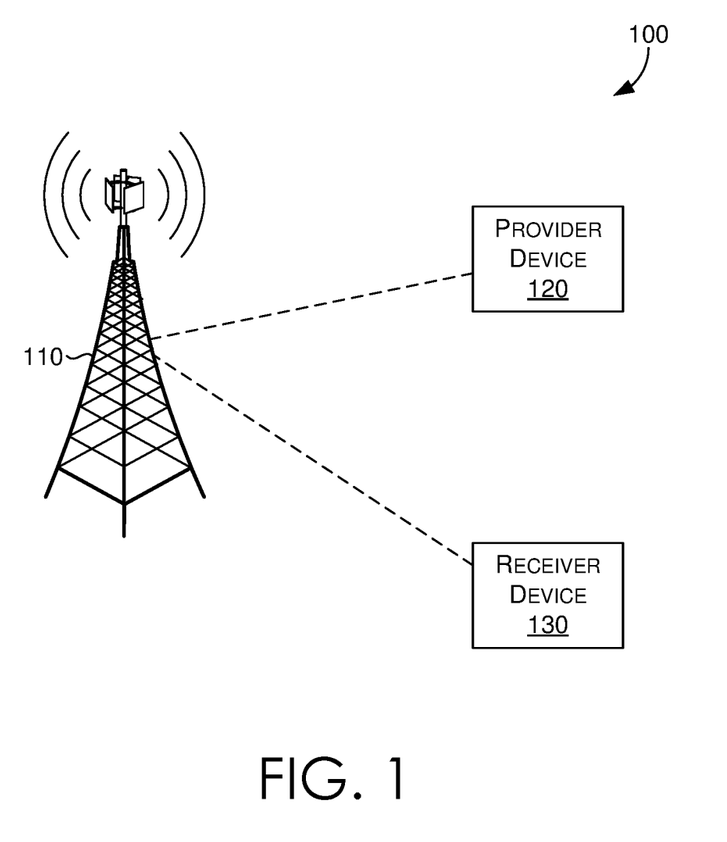
FIG. 1 depicts an example of a network environment in accordance with one or more embodiments.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more user devices 120 and 130. The user device 120 may also be known as a provider device or a calling device. In some embodiments, the network environment 100 may include a telecom network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition the network environment 100 may be utilized in a variety of manners, such as a single network, multiple networks, or as a network of networks, but, ultimately, is shown as simplified as possible to avoid the risk of confusing other aspects of the present disclosure.

The telecom network included in the network environment 100 may include or otherwise may be accessible through a cell site (e.g., the cell site 110). The cell site may include one or more antennas, base transmitter stations, radios, transmitter/receivers, digital signal processors, control electronics, GPS equipment, power cabinets or power supply, base stations, charging stations, etc. such that the cell site may provide a communication link between one or more user devices (e.g., one or more provider devices and/or receiver devices such as the user devices 120 and 130) and other components, systems, equipment, and/or devices of the network environment 100. The base station and/or a computing device (e.g., whether local or remote) associated with the base station may manage or otherwise control the operations of components of the cell site.

In some embodiments, the cell site may be operable in a non-stand alone (NSA) mode. In the non-stand alone mode the network environment 100 may take the form of, for example, an E-UTRAN New Radio-Dual Connectivity (EN-DC) network. In an EN-DC network, a provider device and/or a receiver device may connect to or otherwise access a 4G, LTE, 5G, or any other suitable network simultaneously. In the stand alone mode, the telecom network may take the form of a 5G, 6G, or any other suitable network.

In some embodiments, the network environment 100 may include one or more nodes communicatively coupled to one or more provider devices and one or more receiver devices such that the node(s) may transmit to and receive requests and/or data from the provider device(s) and/or the receiver device(s). The one or more nodes may include a Next Generation Node B (e.g., gNodeB or gNB) or any other suitable node. The one or more nodes may correspond to one or more frequency bands within which the provider device(s) and/or the receiver device(s) may connect to the network environment such as, but not limited to, a telecommunication network or a portion thereof.

In some embodiments, the node(s) may be included within the cell site (e.g., the cell site 110), external to the cell site, or otherwise communicatively coupled to the cell site. The node(s) may allocate radio frequency, or a portion thereof, to user device(s).

In some embodiments, the provider device(s) and/or the receiver device(s) may take the form of a wireless or mobile device capable of communication via the network environment 100. For example, the provider device 120 may take the form of a mobile device capable of communication via a telecom network such as, but not limited to, a wireless telecommunication network. In this regard, the provider device(s) and/or the receiver device(s) may be any computing device that communicates by way of a network, for example, a 4G, LTE, WiMAX, Wi-Fi, 5G, 6G, or any other type of network.

In some embodiments, the network environment 100 may connect subscribers (e.g., current subscribers and/or potential subscribers) to a service provider or a plurality of service providers. Alternatively or additionally, the network environment 100 may be associated with a specific telecommunication provider or a plurality of telecommunication providers that provide services (e.g. 5G, 6G, voice, location, data, etc.) to one or more user devices. For example, the provider device 120 and/or the receiver device 130 may be subscribers to a telecommunication service provider, in which the devices are registered or subscribed to receive voice and data services (e.g., receive content that may be streamed, downloaded, etc.) over the network environment 100. The network environment 100 may include any communication network providing voice and/or data service(s), such as, for example, a Wi-Fi network, 4G network (LTE, WiMAX, HSDPA), 5G network, or 6G network.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
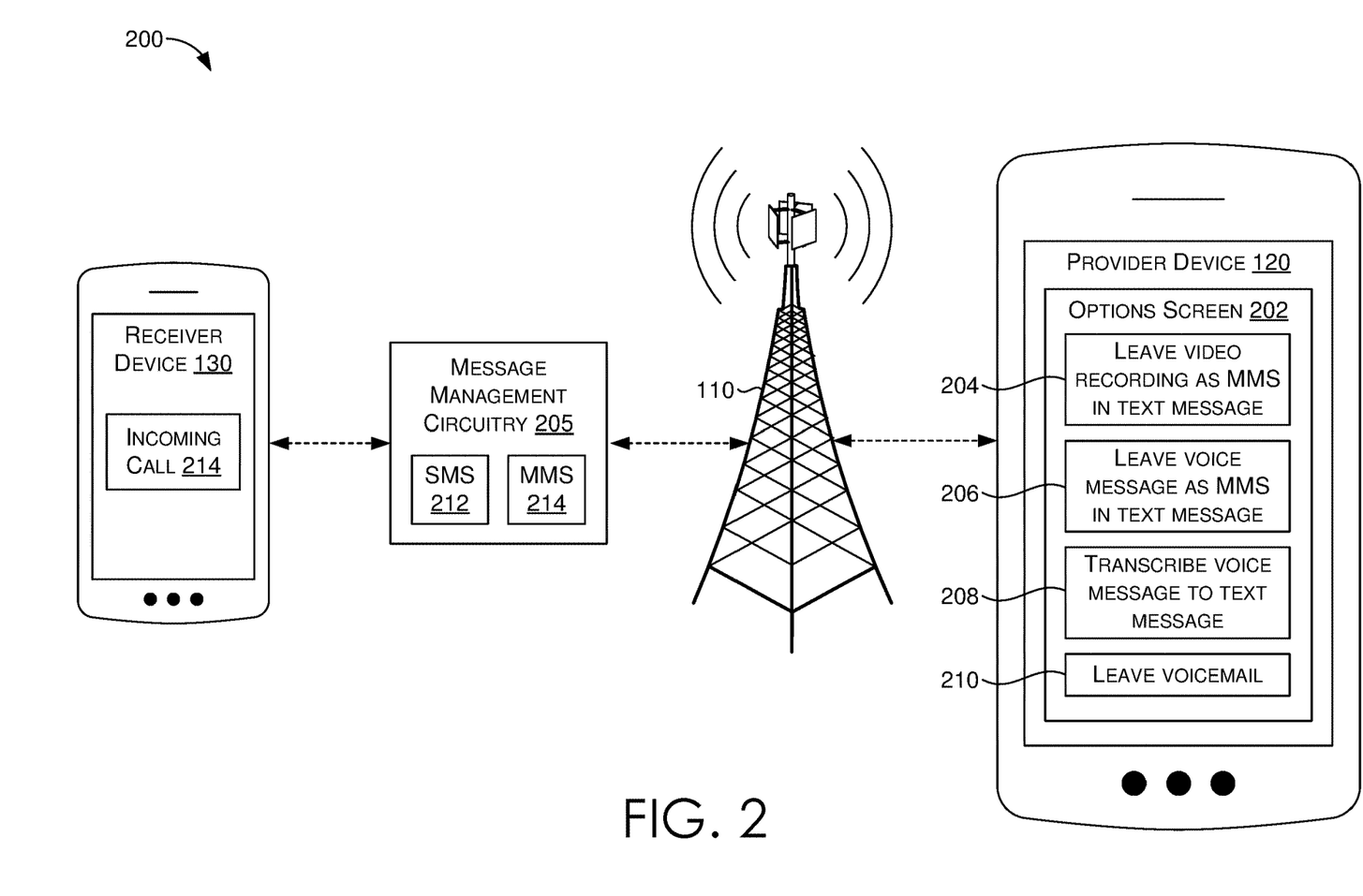
FIG. 2 is a diagram of a network environment including a provider device and receiver device in accordance with an example embodiment.

FIG. 2 is a diagram of the network environment 200 (e.g., a telecommunication environment such as, but not limited to, a wireless telecommunication environment) according to an example embodiment. In the present embodiment, the network environment 200 includes the cell site 110, message management circuitry 205, provider device 120, and receiver device 130. Although some of the components in the network environment 200 are depicted as single components (e.g., a single provider device, receiver device, message management circuitry, cell site, etc.), in some embodiments, the network environment 200 may include a plurality of such components.

The provider device 120 may also include an options screen 202 that appears when a call is being routed to a voicemail box. Options screen 202 allows a user to directly select one of four options for routing a voice message or clip when a called party or receiver device 130 does not answer the incoming call. The options provided by the options screen 202 may include: an option to leave a video recording as a multimedia messaging service (MMS) in a text message 204; the option to leave a voice message as a MMS in a text message 206; the option to transcribe the voice message to a text message 208; and the option to leave a voicemail message 210.

In some embodiments, the receiver device 130 receives the standard incoming call screen indication. The called party may be provided with the normal options for an incoming call: answer, hang up, or send to voicemail.

In some embodiments, a calling device, such as provider device 120 presents a user with an options screen 202 after a receiving device 130 does not answer a call. The options screen 202 may be presented on the screen of provider device 120 after a call is allowed to go to a voicemail box on receiver device 130. In other embodiments, the user of provider device 120 may set a pre-determined number of rings before the option screen 202 is presented, without waiting for the call on receiving device 130 to be routed to voicemail.

The option screen 202 is presented on provider device 120 after the dialer has determined that the receiving device 130 is not answering, or after a pre-determined number of rings has been performed. The dialer is a program that receives a user's input of a phone number and begins the transmit connection process. On a mobile device, the dialer may be a software application on the mobile device to make calls, including Voice over Internet Protocol (VOIP) calls. The dialer may also be used when initiating text messages. The dialer redirects the user to the message management circuitry 205 using the options screen 202. Once the options screen 202 is presented the provider device 120 exits the dialer application and enters a message management circuitry 205. Message management circuitry may provide multiple messaging types, such as Short Message Service (SMS) 212, Multimedia Messaging Service (MMS) 214, or other message types such as Rich Communication Services (RCS).

SMS is a text messaging service used by many telephone, internet, and mobile device systems. SMS uses standardized communication protocols allowing mobile devices to exchange short test messages. Messages are sent to a short message service center (SMSC), which provides a "store and forward mechanism." The SMSC attempts to send messages to the SMSC's recipients. If a recipient is not reachable, the SMSC queues the message for later retry. Message delivery is "best effort," so there are no guarantees that a message will actually be delivered to the recipient, but delay or complete loss of a message is uncommon, typically affecting less than five percent of messages.

SMS is a stateless communication protocol in which every SMS message is considered to be entirely independent of other messages. In the context of the embodiments discussed herein, each voice clip that is transmitted or transcribed to a text message is independent of other messages.

In other embodiments discussed herein, the Rich Communication Service (RCS) may be used in place of the SMS messaging application. RCS is a communication protocol between phone and carrier, aimed at replacing SMS messages with a text message system that is richer, provides phonebook polling for service discovery, and can transmit in-call multimedia. RCS allows the voice clip of the disclosure to include video when the message is sent in place of a voicemail message.

Multimedia Messaging Service (MMS) provides a method for sending messages that include multimedia content to and from a mobile device over a cellular network. The MMS standard extends the core SMS capability, allowing the exchange of text messages longer than 160 characters. MMS can deliver up to 40 seconds of video, one image, a slideshow of multiple images, or audio.

MMS delivers messages differently than SMS. The first step in sending an MMS message causes the sending device to encode the multimedia content. The message is then forwarded to the carrier's MMS store and forward server, the multimedia message servicing center (MMSC). If the receiving device is on a different carrier, the message is forwarded to the recipient's carrier MMSC.

The options screen 202 allows a caller to leave a voice clip or text message in place of a traditional voice message, using the message management circuitry 205. The clip may include audio and/or video. A user may also opt to leave a voice clip that is sent as a test message. The provider device 120 user may elect to enter the message management circuitry 205 before the unanswered call defaults to the voicemail box and push a response to one of the messaging types, such as SMS, or RCS. A further embodiment may provide options for the voice clip based on the probability of the called party answering the call based on collected call statistics.

Further embodiments may allow a user of the provider device 120 to select a default setting, such as sending the voice clip as a text message for all calls. A user may elect such a default option for all calls and/or the option may be elected automatically upon receipt of an indication that the voicemail box of receiving device 130 is full. The voice clip may be sent as an attachment to the text message or may be transcribed and sent as a text message. Further embodiments may allow the voice clip to be pushed to a receiving device 130 user's cloud storage.

The user of provider device 120 may also elect to send the voice clip as a video clip using the MMS 214 application. Once a user elects the option to leave a video recording as MMS in text message 204, a further option selection to elect MMS or RCS may be presented.

Figure 3:
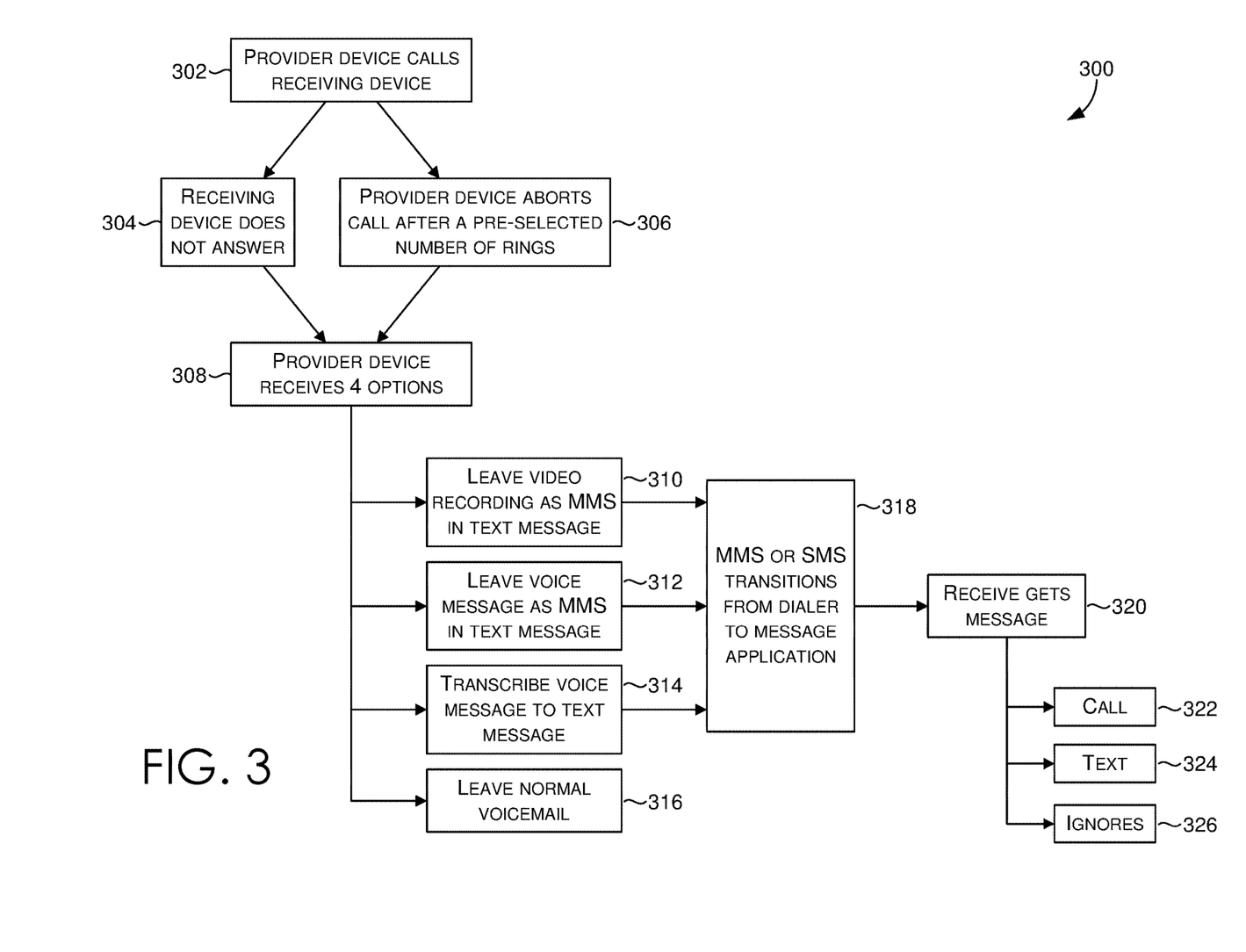
FIG. 3 depicts a flowchart of an exemplary method for sending a voice clip as a short message service (SMS) message in place of a voicemail message, in accordance with an example embodiment.

FIG. 3 depicts a flow chart of an exemplary method 300 for sending a voice clip as a short message service (SMS) message in place of a voicemail message, in accordance with an example embodiment. The method begins in block 302 when a provider device, which may also be known as a calling device, calls a receiving device. The provider or calling device uses a dialer application to enter to desired number to be called.

Once the call is placed, if the receiving device does not answer, two scenarios may occur. In block 304, the receiving device does not answer. In block 306, the provider or calling device may abort the call after a pre-selected number of rings. The pre-selected number of rings may be selected by the provider device user or may be determined by statistical analysis of answered calls placed by the provider device to the receiver device.

After either scenario shown in blocks 304 and 306, the provider device user is presented in block 308 with an options screen listing four options for the unanswered call. In block 310 the provider device user may elect to leave a video recording as a MMS in a text message. In block 312 the provider device user may opt to leave a voice message as a MMS in a text message. Block 314 gives the provider device user the option to transcribe the voice message to a text message. The provider device user may also opt to leave a normal voicemail in block 316.

If the provider device user opts to leave a video recording as a MMS in a text message, leave a voice message as a MMS in a text message, or transcribe the voice message to a text message, the mobile device in block 318 transitions from the dialer to the message application.

Next, in block 320, the receiving device receives the message. The message recipient may elect to respond in one of three ways. In block 322, the receiving device user may call the provider device. In block 324, the receiving device user may text the provider device. The receiving device user may ignore the message, in block 326.

Figure 4:
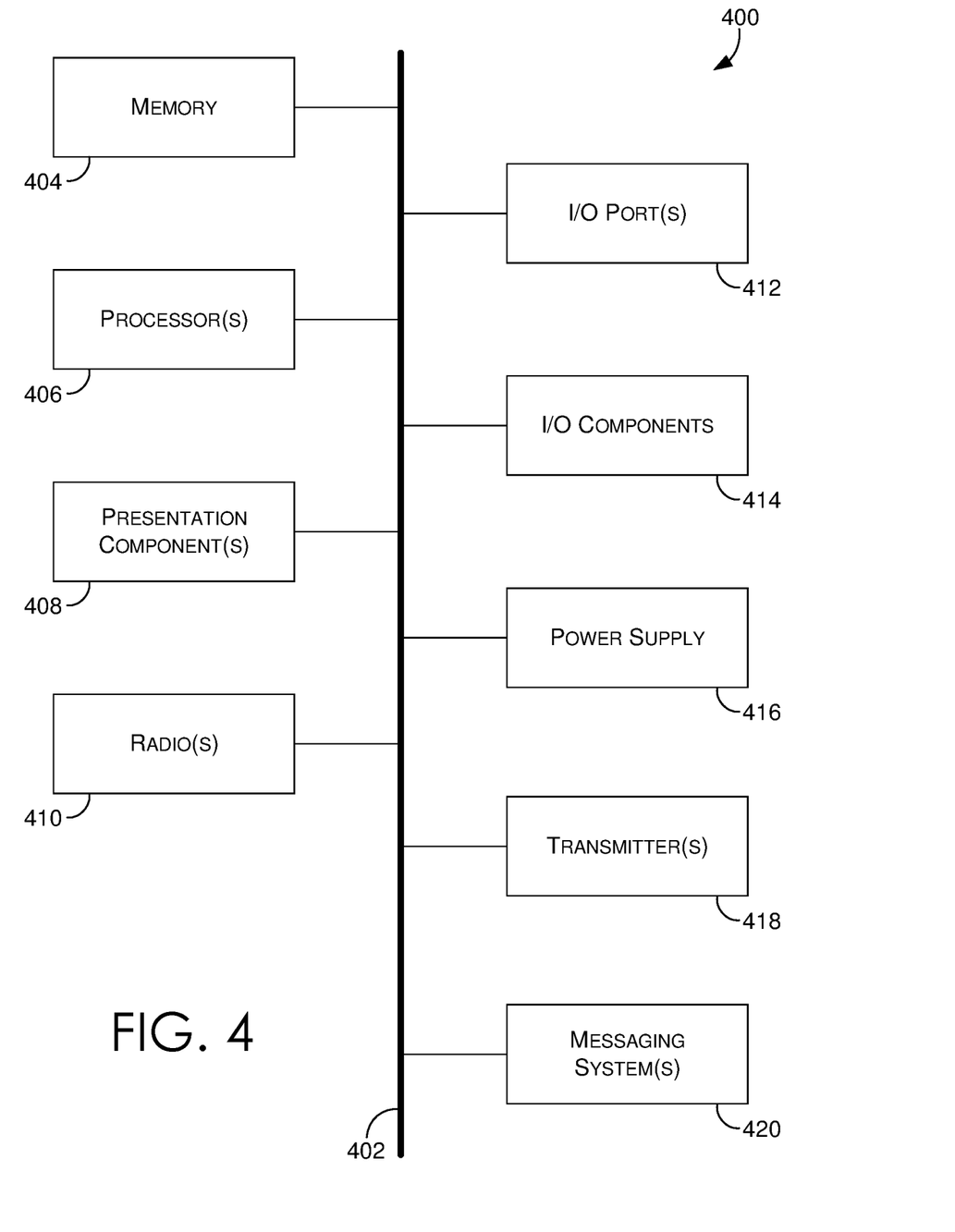
FIG. 4 depicts an exemplary computing device suitable for use in implementations of aspects herein.

Referring to FIG. 4, a block diagram of an example of a computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. In aspects, the computing device 400 may be a base station. In another embodiment, the computing device 400 may be UE capable of two-way wireless communications with an access point. Some non-limiting examples of the computing device 400 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 4, computing device 400 includes a bus 402 that directly or indirectly couples various components together. The bus 402 may directly or indirectly one or more of memory 404, processor(s) 406, presentation component(s) 408 (if applicable), radio(s) 410, input/output (I/O) port(s) 412, input/output (I/O) component(s) 414, power supply 416, transmitter(s) 418, and messaging system(s) 420. Although the components of FIG. 4 are shown with lines for the sake of clarity, in reality, delineating various components is not so clear, and metaphorically, the lines would more accurately be grey and fuzzy. For example, one may consider a presentation component(s) 408 such as a display device to be one of I/O components 414. Also, the processor(s) 406 may include memory 404, in another example. The present disclosure hereof recognizes that such is the nature of the art, and reiterates that FIG. 4 is merely illustrative of an example of a computing device 400 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 404 may take the form of memory components described herein. Thus, further elaboration will not be provided here, but it should be noted that memory 404 may include any type of tangible medium that is capable of storing information, such as a database or data store. A database or data store may be any collection of records, files, or information encoded as electronic data and stored in memory 404, for example. In one embodiment, memory 404 may include a set of embodied computer-readable and executable instructions that, when executed, facilitate various functions or elements disclosed herein. These embodied instructions will variously be referred to as "instructions" or an "application" for short.

Processor(s) 406 may be multiple processors that receive instructions and process them accordingly. Presentation component(s) 408, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 410 represents one or more radios that facilitate communication with a wireless telecommunication network. For example, radio(s) 410 may be connected to one or more antenna elements through a physical path. Illustrative wireless telecommunications technologies include CDMA, GPRS, TDMA, GSM, and the like. Radio(s) 410 might additionally or alternatively facilitate other types of wireless communications including Wi-Fi, WiMAX, 3G, 4G, LTE, mMIMO, 5G, 6G, NR, VOLTE, and/or other VoIP communications. As can be appreciated, in various embodiments, radio(s) 410 may be configured to concurrently support multiple technologies, as previously discussed herein. As such, each of many radio(s) 410 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 412 may take a variety of forms. Exemplary I/O ports 412 may include a USB jack, a stereo jack, an infrared port, a firewire port, other proprietary communications ports, and the like. Input/output (I/O) components 414 may comprise keyboards, microphones, speakers, touchscreens, and/or any other item usable to directly or indirectly input data into the computing device 400.

Power supply 416 may include batteries, fuel cells, and/or any other component that may act as a power source to supply power to the computing device 400 or to other network components, including through one or more electrical connections or couplings. Power supply 416 may be configured to selectively supply power to different components independently and/or concurrently.

Transmitter(s) 418 may include multiple transmitters in communication with radio(s) 410, processor(s) 406, presentation component(s) 408, and messaging system(s) 420. Messaging system(s) 420 may include SMS, MMS, or RCS applications. The options screen discussed above may form a portion of presentation component(s) 408. The presentation component(s) 408 may also provide option buttons or radio selection buttons for inputs selected from the options screen.

Finally, regarding FIGS. 1 through 4, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and sub-combinations are of utility and may be employed without reference to other features and sub-combinations and are contemplated within the scope of the claims.

The invention claimed is:

1. A method for sending a voice clip as a message in place of a voicemail message, the method comprising:
calling, by a provider device, a receiving device;
determining a number of rings not to be exceeded for the receiving device, the number of rings not to be exceeded being determined based on a statistical analysis of a plurality of historical calls placed by the provider device to the receiving device, determining that the number of rings not to be exceeded has been exceed;

based on the number of rings not to be exceeded being exceeded, generating the voice clip on the provider device using one of a plurality of options comprising: leave a video recording in a text message, leave the voice clip in a text message, transcribe the voice clip to text message, leave a voicemail;

receiving a section of one of the multiple options on the provider device;

transitioning, by the provider device from a dialer to a message application to create the voice clip using the selected one of the multiple options, and;

delivering the voice clip to the receiving device;

further comprising: aborting calling the receiving device after a pre-selected number of rings; wherein the pre-selected number of rings is determined by a user.

2. The method of claim 1, wherein the leave a video recording in a text message option leaves the video recording in a multimedia messaging service (MMS) message.

3. The method of claim 2, wherein the leave a video recording in a text message option leaves the video recording in a rich communication services (RCS) message.

4. The method of claim 1, wherein the leave a voice clip in a text message option leaves the voice clip in a short message service (SMS) message.

5. The method of claim 1, wherein the transcribe the voice clip to text message sends the text message using a short message service (SMS) message.

6. The method of claim 1, wherein the pre-selected number of rings is determined using statistical information from prior calls to the receiving device.

7. The method of claim 1, in which the message application transitioned to is one of: short message service (SMS), multimedia messaging service (MMS), or rich communication services (RCS).

8. The method of claim 1, in which selecting one of the multiple options selects a messaging service.

9. Non-transitory computer-readable storage media having computer-executable instructions embodied thereon that, when executed by one or more processors, cause the one or more processors to:

calling, by a provider device, a receiving device;

determining a number of rings not to be exceeded for the receiving device, the number of rings not to be exceeded determined based on a statistical analysis of a plurality of historical calls by placed by the provider device to the receiving device;

determining that the number of rings not to be exceeded has been exceed;

based on the number of rings being exceeded, generating the voice clip on the provider device using one of a plurality of options comprising: leave a video recording in a text message, leave the voice clip in a text message, transcribe the voice clip to text message, leave a voicemail;

receiving a section of one of the multiple options on the provider device; transitioning, by the provider device from a dialer to a message application to create the voice clip using the selected one of the multiple options, and;

delivering the voice clip to the receiving device;

further comprising: aborting calling the receiving device after a pre-selected number of rings; wherein the pre-selected number of rings is determined by a user.

10. The non-transitory computer-readable storage media of claim 9, wherein the options screen provides multiple buttons for selecting an option.

11. The non-transitory computer-readable storage media of claim 10, wherein the option for leave a video recording in a text message leaves the video recording in a multimedia messaging service (MMS) message or a rich communication services (RCS) message.

12. The non-transitory computer-readable storage media of claim 9, wherein the option for leave a voice clip in a text message option leaves the voice clip in a short message service (SMS) message.

13. The non-transitory computer-readable storage media of claim 9, wherein the option for transcribe voice clip to text message sends the text message using a short message service (SMS) message.

14. The non-transitory computer-readable storage media of claim 9, wherein the pre-selected number of rings is determined using statistical information from prior calls to the receiving device.

15. The non-transitory computer-readable storage media of claim 9, in which the message application transitioned to is one of: short message system (SMS), multimedia messaging service (MMS), or rich communication services (RCS).

16. A system for sending a voice clip as a message in place of a voicemail, the system comprising:

a provider device comprising an options screen;

a cell site; an message management circuitry communicatively coupled to the cell site and a contact center, the provider device structured to:

call a receiving device;

determine a number of rings not to be exceeded for the receiving device, the number of rings not to be exceeded determined based on a statistical analysis of a plurality of historical calls by placed by the provider device to the receiving device, determine that the number of rings not to be exceeded has been exceed based on determining that the number of rings has been exceeded, receive multiple options for creating the voice clip on the provider device after failing to receive an answer from the receiving device, the multiple options comprising: leave a video recording in a text message, leave the voice clip in a text message, transcribe the voice clip to text message, leave a voicemail;

receiving a selection of one of the multiple options on the provider device;

transitioning, by the provider device from a dialer to a message application to create the voice clip using the selected one of the multiple options, and delivering the voice clip to the receiving device;

further comprising: aborting calling the receiving device after a pre-selected number of rings; wherein the pre-selected number of rings is determined by a user.

* * * * *